US012016509B2

(12) United States Patent
Patil et al.

(10) Patent No.: US 12,016,509 B2
(45) Date of Patent: Jun. 25, 2024

(54) WATER FEED TUBE FOR DISHWASHER WITH INTEGRATED RETAINER

(71) Applicant: Whirlpool Corporation, Benton Harbor, MI (US)

(72) Inventors: Amit Suryakant Patil, Pune Maharashtra (IN); Brian Linstedt, Marion, OH (US); Marcos Herrmann, Stevensville, MI (US); Jayesh Prakash Borase, Pune Maharashtra (IN)

(73) Assignee: Whirlpool Corporation, Benton Harbor, MI (US)

(*) Notice: Subject to any disclaimer, the term of this patent is extended or adjusted under 35 U.S.C. 154(b) by 549 days.

(21) Appl. No.: 17/220,017

(22) Filed: Apr. 1, 2021

(65) Prior Publication Data

US 2022/0313057 A1 Oct. 6, 2022

(51) Int. Cl.

| | |
|---|---|
| ***A47L 15/42*** | (2006.01) |
| ***A47L 15/50*** | (2006.01) |
| ***B05B 3/02*** | (2006.01) |
| ***B05B 15/652*** | (2018.01) |

(52) U.S. Cl.

CPC ......... *A47L 15/4214* (2013.01); *A47L 15/508* (2013.01); *B05B 3/025* (2013.01); *B05B 15/652* (2018.02)

(58) Field of Classification Search

CPC ........................... A47L 15/4214; A47L 15/508

See application file for complete search history.

(56) References Cited

U.S. PATENT DOCUMENTS

| | | | |
|---|---|---|---|
| 6,612,009 | B1 | 9/2003 | Laszczewski, Jr. et al. |
| 8,561,624 | B2 | 10/2013 | Oblinger et al. |
| 10,405,727 | B2 | 9/2019 | Boyer |
| 2007/0215187 | A1 | 9/2007 | Koch et al. |
| 2012/0097198 | A1 | 4/2012 | Schmidt et al. |

(Continued)

FOREIGN PATENT DOCUMENTS

| | | | |
|---|---|---|---|
| CN | 111067451 | A | 4/2020 |
| KR | 101241458 | B1 | 3/2013 |
| KR | 101634173 | B1 | 6/2016 |

OTHER PUBLICATIONS

European Search Report for EP22164871.0-1016, dated Sep. 2, 2022 (81 Pages).

*Primary Examiner* — Joseph L. Perrin
*Assistant Examiner* — Irina Graf
(74) *Attorney, Agent, or Firm* — Harness, Dickey & Pierce, PLC

(57) ABSTRACT

A water feed tube assembly for a dishwasher with a water feed tube having one or more inlets and outlets and front, back, and side walls. At least one outlet is positioned on the front wall of the water feed tube. The water feed tube includes a manifold docking retainer that is integral with the water feed tube at a position adjacent to the outlet. The manifold docking retainer includes first and second ears that are positioned on and extend integrally from the side walls of the water feed tube such that the first and second ears of the manifold docking retainer are configured to receive first and second docking arms of a spray arm manifold. The manifold docking retainer includes first and second knobs that are positioned on and extend integrally from the front wall of the water feed tube to mate with the spray arm manifold.

20 Claims, 4 Drawing Sheets

(56) References Cited

U.S. PATENT DOCUMENTS

| | | | |
|---|---|---|---|
| 2017/0172375 | A1 | 6/2017 | Chen et al. |
| 2017/0181599 | A1 | 6/2017 | Choi et al. |
| 2017/0245727 | A1* | 8/2017 | Blanchard ........... A47L 15/4285 |
| 2019/0290099 | A1 | 9/2019 | Agrawal |
| 2021/0244256 | A1* | 8/2021 | Lee ....................... A47L 15/428 |

* cited by examiner

WATER FEED TUBE FOR DISHWASHER WITH INTEGRATED RETAINER

FIELD

The present disclosure relates generally to dishwashers and more particularly to docking features found on a water feed tube of a dishwasher.

BACKGROUND

The statements in this section merely provide background information related to the present disclosure and may not constitute prior art.

Many residential and commercial kitchens have dishwashing appliances, such as a dishwasher. Dishwashers typically include an interior dish washing compartment that is accessed through a door. One or more dishwasher racks for holding and organizing pots, pans, dishes, and utensils are typically provided in the dish washing compartment, which can slid in and out of the dish washing compartment for easier loading and unloading. During operation of the dishwasher, the door is closed and water and/or a mixture of water and dishwashing soap or detergent is sprayed inside the dish washing compartment to remove food build-up, rinse, and sanitize the pots, pans, dishes, and utensils placed inside the dish washing compartment. Many dishwashers use rotating spray arms to distribute wash and rinse water combined with dishwashing soap, detergent, and/or drying aids evenly throughout the dish washing compartment.

Many dishwashers use at least two spray arms, where one spray arm is located along the top of the dishwashing compartment and another spray arm is located in the middle of the dishwashing compartment. A water feed tube, that runs along at least a back wall of the dishwashing compartment is often used to supply water and/or a mixture of water and dishwashing soap or detergent to the spray arms. The upper spray arm is typically mounted to a top wall of the dishwashing compartment or directly to the water feed tube. The lower spray arm is typically mounted to one of the dishwasher racks using a spray arm manifold. Because the dishwasher racks can typically slide in and out relative to the water feed tube, the spray arm manifold is typically designed to mate with a port on the water feed tube when the dishwasher rack is slid inside the dish washing compartment. To ensure proper mating and alignment, additional docking features are sometimes provided.

Typically, both the port and the docking features associated with the connection interface between the spray arm manifold and the water feed tube are provided on a separate component that attaches to the water feed tube. This separate component is utilized because the geometry of the docking features that are typically used is difficult and expensive to manufacture using the same manufacturing processes used to create the water feed tube.

SUMMARY

This section provides a general summary of the disclosure, and is not a comprehensive disclosure of its full scope or all of its features.

In accordance with one aspect of the present disclosure, a water feed tube assembly for a dishwasher is provided where the water feed tube assembly includes a water feed tube with front, back, and side walls. The water feed tube includes one or more inlets and outlets. At least one of the outlets is positioned in the front wall of the water feed tube. The water feed tube also includes a manifold docking retainer positioned adjacent to the outlet on the front wall of the water feed tube. The manifold docking retainer is integral with the water feed tube and includes first and second ears. The first and second ears are positioned on and extend integrally from the side walls of the water feed tube such that the first and second ears of the manifold docking retainer are configured to receive first and second docking arms of a spray arm manifold.

In accordance with another aspect of the present disclosure, the spray arm manifold includes mounting features that attach the spray arm manifold to a dishwasher rack. The dishwasher rack is configured to slide towards and away from the outlet on the front wall of the water feed tube between extended and retracted positions. The spray arm manifold includes a manifold inlet, a manifold outlet, and a manifold passageway extending between the manifold inlet and the manifold outlet. The spray arm manifold also includes a manifold dock positioned adjacent to the manifold inlet and a first spray arm mount positioned adjacent to the manifold outlet.

The manifold dock includes a manifold inlet cavity. The first and second docking arms of the spray arm manifold are arranged to each side of the manifold inlet cavity, such that the manifold inlet cavity is configured to mate with the outlet on the front wall of the water feed tube when the dishwasher rack is slid to the retracted position, which feeds a supply of water and/or a mixture of water and dishwashing soap or detergent to the spray arm manifold.

In accordance with another aspect of the present disclosure, the water feed tube includes a lower segment, an upper segment, and a middle segment that extends between the upper and lower segments. The lower segment of the water feed tube includes at least one inlet. The middle segment of the water feed tube includes a front wall, a back wall, and at least one outlet on the front wall of the middle segment. A first spray arm is rotatably mounted to the first spray arm mount on the spray arm manifold such that the first spray arm is supported on and rotatable relative to the spray arm manifold. The manifold docking retainer is positioned on the middle segment of the water feed tube adjacent to the outlet and is integral with the middle segment of the water feed tube. In addition to the first and second ears, which extend integrally from the side walls of the middle segment of the water feed tube, the manifold docking retainer includes first and second knobs that are positioned to be received in the inlet cavity of the spray arm manifold when the dishwasher rack is slid to the retracted position.

Advantageously, the design, arrangement, and geometry of the manifold docking retainer described herein allows the spray arm manifold docking features, such as the first and second ears and the first and second knobs, to be integrally formed with the water feed tube using the same manufacturing process used to create the water feed tube. This eliminates the cost and the manufacturing and assembly complexities associated with providing docking features on a separate part. The manifold docking retainer described herein also provides improved docking functionality and eliminates a potential failure mode, where a separate part containing the docking features separates (i.e., unsnaps and pulls away from) the water feed tube.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
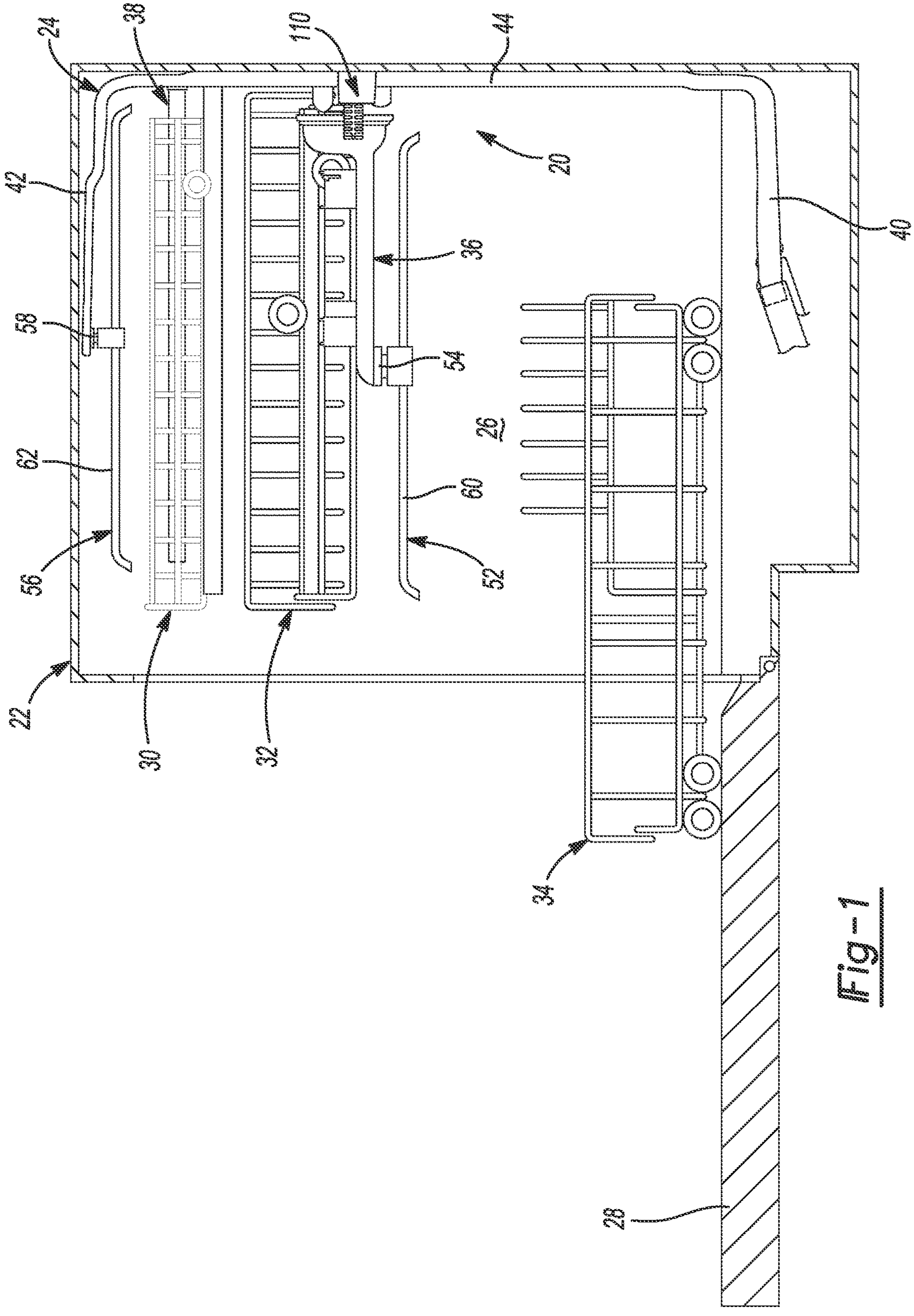
FIG. 1 is a side section view of an exemplary dishwasher that has been fitted with an exemplary water feed tube assembly constructed in accordance with the teachings of the present disclosure.

Referring to the Figures, wherein like numerals indicate corresponding parts throughout the several views, a water feed tube assembly 20 for a dishwasher 22 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

For purposes of description herein the terms "up," "down," "above," "below," "upper," "lower," "top," "bottom," and derivatives thereof shall relate to the assembly as oriented in FIGS. 1-6. However, it is to be understood that the apparatus and assemblies described herein may assume various alternative orientations.

With reference to FIG. 1, a water feed tube 24 of the water feed tube assembly 20 is illustrated installed inside a dish washing compartment 26 of dishwasher 22. Access to the dishwashing compartment is provided by opening a front-load door 28. One or more dishwasher racks 30, 32, 34 for holding and organizing pots, pans, dishes, and utensils are provided in the dish washing compartment 26 and are mounted or otherwise arranged such that they can be slid between retracted and extended positions, similar to how furniture drawers operate. Although other configurations are possible, in the example show in FIG. 1, three dishwasher racks 30, 32, 34 are illustrated, a top dishwasher rack 30, a middle dishwasher rack 32, and a bottom dishwasher rack 34. In FIG. 1, the top and middle dishwasher racks 30, 32 are illustrated in retracted positions while the bottom dishwasher rack 34 is illustrated about half way between the retracted position and the extended position. A spray arm manifold 36 is mounted to the middle dishwasher rack 32 and a spray tube 38 is mounted to the top dishwasher rack 30. As will be explained in greater detail below, the spray arm manifold 36 and the spray tube 38 mate with and receive water and/or a mixture of water and dishwashing soap or detergent from the water feed tube 24. Thus, it should be appreciated that the term "water," as used herein in the names of components, is not limiting and should be understood as encompassing components capable of carrying water, various water-based mixtures or solutions, and other fluids in a dishwasher 22.

Figure 2:
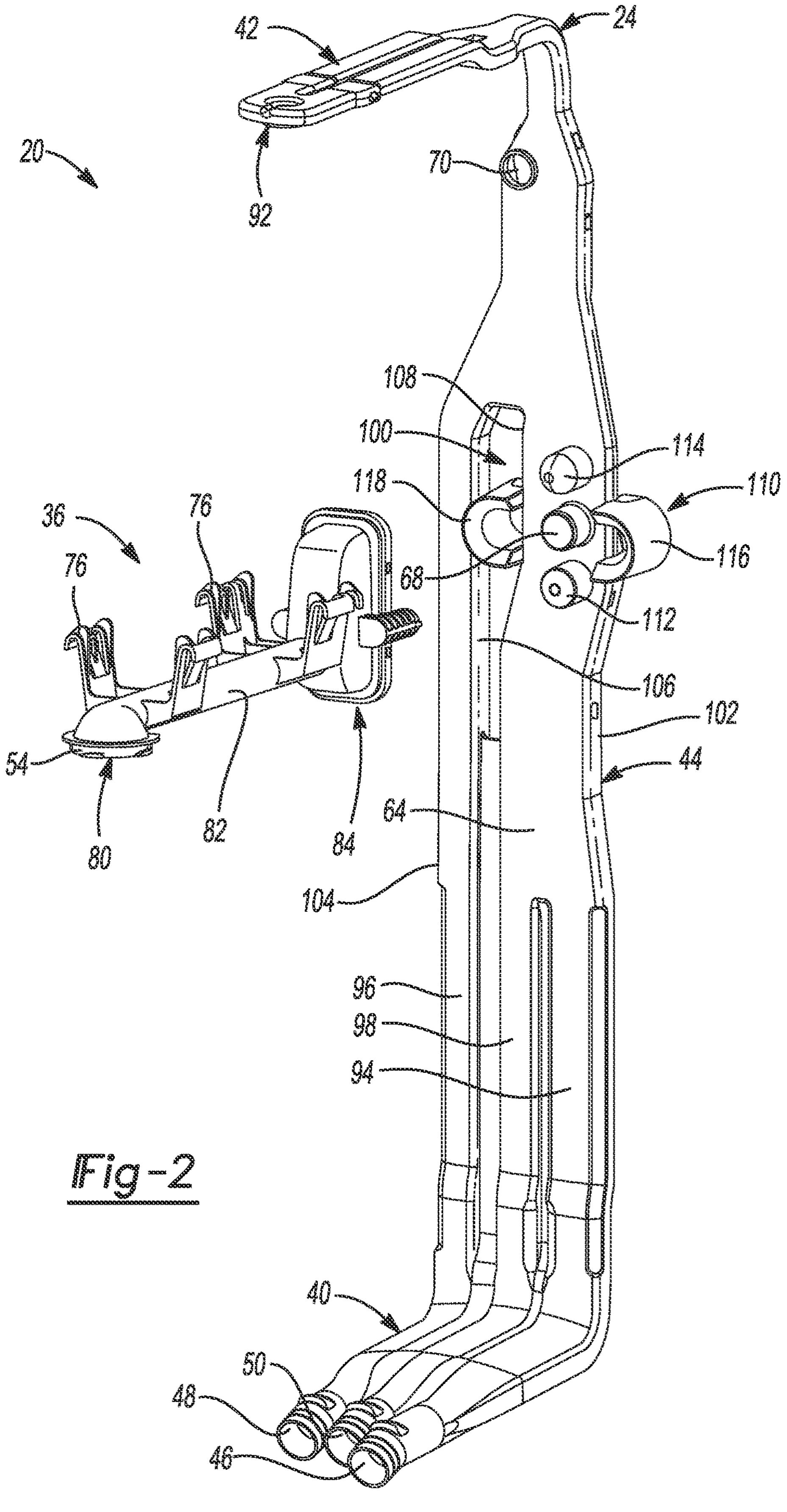
FIG. 2 is a front perspective view of the exemplary water feed tube assembly illustrated in FIG. 1.

With additional reference to FIG. 2, the water feed tube 24 generally includes a lower segment 40, an upper segment 42, and a middle segment 44. Although some variations may be possible, the lower segment 40 and the upper segment 42 of the water feed tube 24 generally extend in substantially horizontal directions, while the middle segment 44 of the water feed tube 24 generally extends in a substantially vertical direction between the lower and upper segments 40, 42. The lower segment 40 of the water feed tube 24 includes one or more inlets 46, 48, 50 that are configured to be connected in fluid communication with a pump (not shown). Although other configurations are possible, in the illustrated example, the lower segment 40 of the water feed tube 24 includes a first inlet 46, a second inlet 48, and a third inlet 50.

As best seen in FIG. 1, a first spray arm 52 is rotatably mounted to the spray arm manifold 36 at a first spray arm mount 54 such that the first spray arm 52 is supported on and rotatable relative to the spray arm manifold 36. A second spray arm 56 is rotatably mounted to the upper segment 42 of the water feed tube 24 at a second spray arm mount 58 such that the second spray arm 56 is supported on and rotatable relative to the upper segment 42 of the water feed tube 24. The first spray arm 52 includes a first spray arm passageway 60 that is connected in fluid communication with the spray arm manifold 36, which supplies water and/or a mixture of water and dishwashing soap or detergent to the first spray arm passageway 60. Similarly, the second spray arm 56 includes a second spray arm passageway 62 that is connected in fluid communication with the upper segment 42 of the water feed tube 24, which supplies water and/or a mixture of water and dishwashing soap or detergent to the second spray arm passageway 62. Both the first and second spray arms 52, 56 include a plurality of nozzles or jets (not shown), which spray water and/or a mixture of water and dishwashing soap or detergent into the dish washing compartment 26 and are configured to cause the first and second spray arms 52, 56 to rotate or spin as the spray is dispensed. As such, water pressure is the driving force that causes the first and second spray arms 52, 56 to rotate such that other driving mechanisms or motors are not required.

Figure 3:
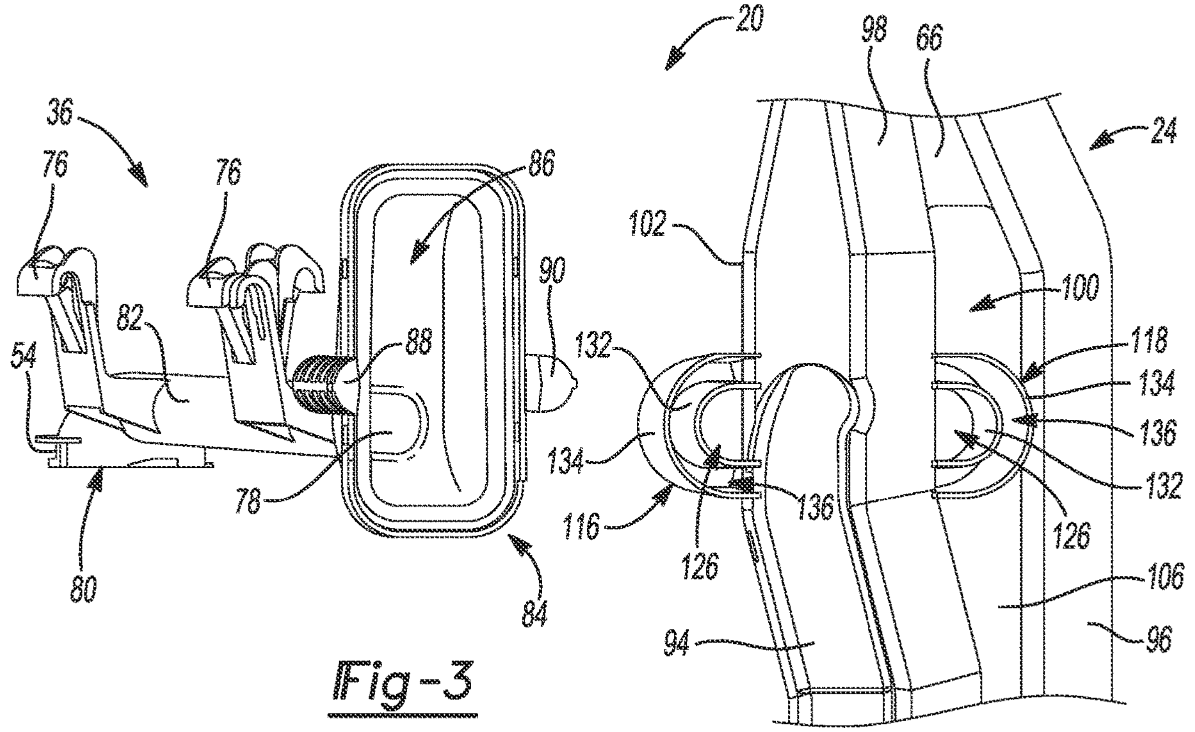
FIG. 3 is a rear perspective view of part of the exemplary water feed tube assembly illustrated in FIG. 1.

With additional reference to FIG. 3, the middle segment 44 of the water feed tube 24 includes a front wall 64, a back wall 66, and side walls 102, 104, 106, 108. Both the upper segment 42 and the middle segment 44 of the water feed tube 24 may include one or more outlets 68, 70, 92. Although other configurations are possible, in the illustrated example, a first outlet 68 is provided on the front wall 64 of the middle segment 44 of the water feed tube 24 and a second outlet 70 is provided on the front wall 64 of the middle segment 44 of the water feed tube 24 at a location that is positioned between the first outlet 68 and the upper segment 42 of the water feed tube 24. Although other configurations are possible, in the illustrated example, the first and second outlets 68, 70 are cylindrical structures that extend forward from the front wall 64 of the middle segment 44 of the water feed tube 24 and terminate at open ends.

The spray arm manifold 36 includes mounting features 76 that attach to the middle dishwasher rack 32. The spray arm manifold 36 further includes a manifold inlet 78, a manifold outlet 80, and a manifold passageway 82 extending between the manifold inlet 78 and the manifold outlet 80. A manifold dock 84 is positioned adjacent to the manifold inlet 78 and the first spray arm mount 54 is positioned adjacent to the manifold outlet 80. The manifold dock 84 includes an inlet cavity 86 and first and second docking arms 88, 90 that are arranged to each side of the inlet cavity 86. The first spray arm 52 is rotatably attached to the spray arm manifold 36 at the first spray arm mount 54 and the first spray arm passageway 60 is connected in fluid communication with the manifold outlet 80.

The spray tube 38, which is rotatably supported on the top dishwasher rack 30, is configured to mate with the second outlet 70 in the water feed tube 24 when the top dishwasher rack 30 is slid to the retracted position, at which point the spray tube 38 becomes connected in fluid communication with the middle segment 44 of the water feed tube 24. The upper segment 42 of the water feed tube 24 includes a third outlet 92 and the second spray arm mount 58 is positioned adjacent to the third outlet 92. The second spray arm 56 is rotatably attached to the upper segment 42 of the water feed tube 24 at the first spray arm mount 54 and the second spray arm passageway 62 is connected in fluid communication with the third outlet 92 of the upper segment 42 of the water feed tube 24.

Although other configurations are possible, in the illustrated example, the water feed tube 24 includes a first conduit 94, a second conduit 96, and a third conduit 98 that are arranged next to one another and are integrally formed as part of a one-piece water feed tube 24. Collectively, the first, second, and third conduits 94, 96, 98 define the front, back, and side walls 64, 66, 102, 104, 106, 108 of the middle segment 44 of the water feed tube 24. The first conduit 94 is arranged in fluid communication with and extends between the first inlet 46 in the lower segment 40 of the water feed tube 24 and the first outlet 68 in the middle segment 44 of the water feed tube 24. Thus, the first conduit 94 extends along the lower segment 40 of the water feed tube 24 and at least part of the middle segment 44 of the water feed tube 24, but not the upper segment 42 of the water feed tube 24. The second conduit 96 is arranged in fluid communication with and extends between the second inlet 48 in the lower segment 40 of the water feed tube 24 and the second outlet 70 in the middle segment 44 of the water feed tube 24. Thus, the second conduit 96 extends along the lower segment 40 of the water feed tube 24 and at least part of the middle segment 44 of the water feed tube 24, but not the upper segment 42 of the water feed tube 24. The third conduit 98 is arranged in fluid communication with and extends between the third inlet 50 in the lower segment 40 of the water feed tube 24 and the third outlet 92 in the upper segment 42 of the water feed tube 24. Thus, the third conduit 98 extends along the lower, upper, and middle segments 40, 42, 44 of the water feed tube 24.

In the illustrated example, the third conduit 98 in the water feed tube 24 is arranged between the first and second conduits 94, 96 and the middle segment 44 of the water feed tube 24 includes a window 100 that forms a space between the second and third conduits 96, 98. In accordance with this arrangement, the first and third conduits 94, 98 are positioned to one side of the window 100 and the second conduit 96 is positioned to an opposite side of the window 100. Thus, the first conduit 94 defines a first side wall 102 along the right side of the middle segment 44 of the water feed tube 24 when viewing the water feed tube 24 from the front (as shown in FIG. 2, for example) and the second conduit 96 defines a second side wall 104 along the left side of the middle segment 44 of the water feed tube 24 when viewing the water feed tube 24 from the front (as shown in FIG. 2, for example). The second conduit 96 also defines a third side wall 106 of the middle segment 44 of the water feed tube 24 where the second conduit 96 borders the window 100 and similarly the third conduit 98 defines a fourth side wall 108 of the middle segment 44 of the water feed tube 24 where the third conduit 98 borders the window 100.

Figure 4:
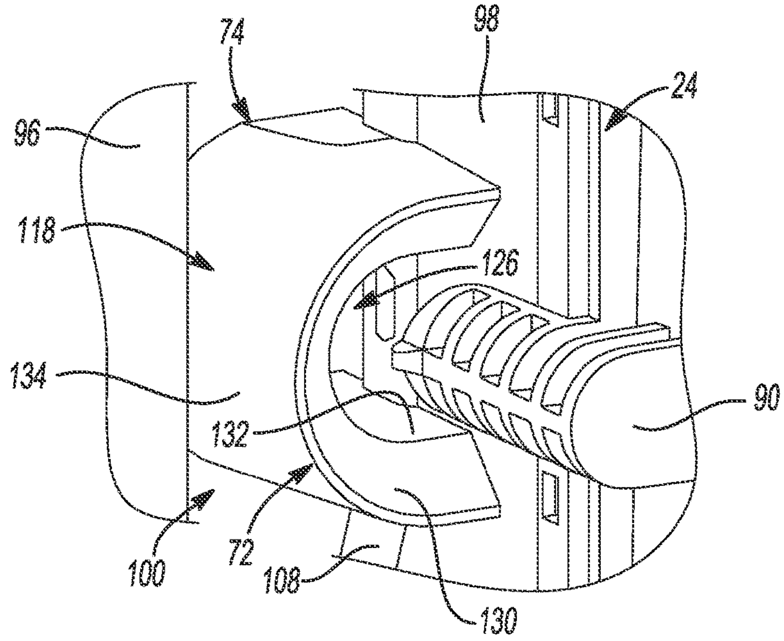
FIG. 4 is an enlarged front perspective view of part of the exemplary water feed tube assembly illustrated in FIG. 1.
Figure 5:
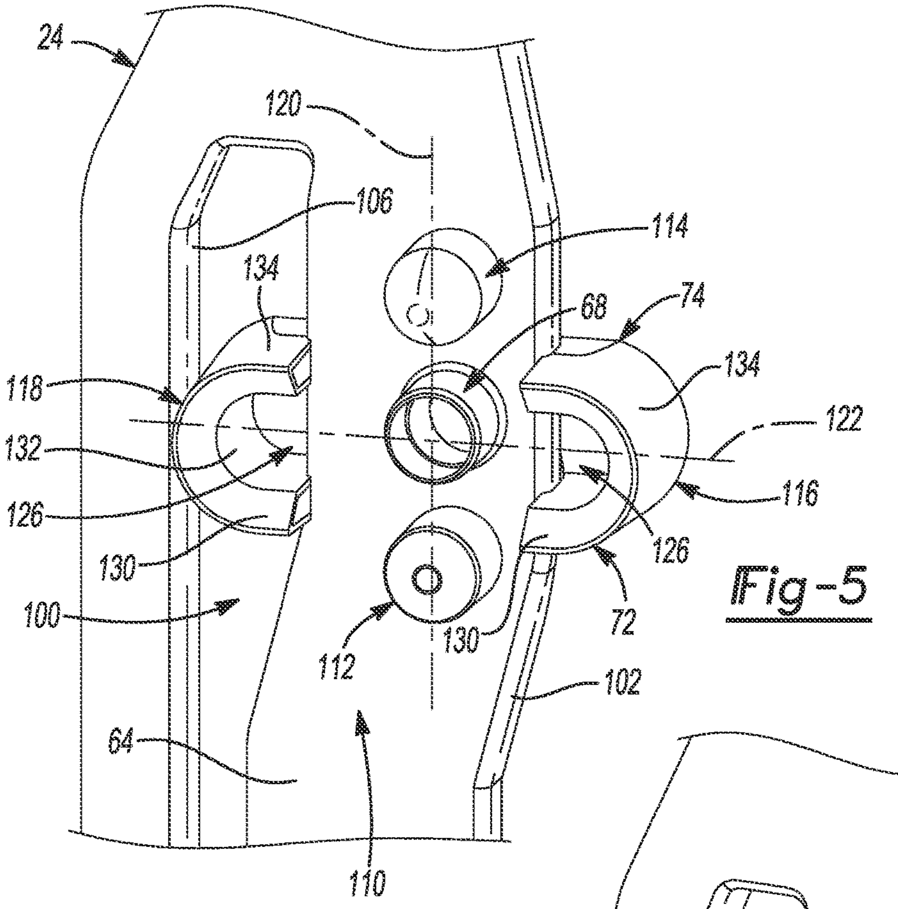
FIG. 5 is an enlarged front perspective view of part of an exemplary water feed tube that has been constructed in accordance with the teachings of the present disclosure.
Figure 6:
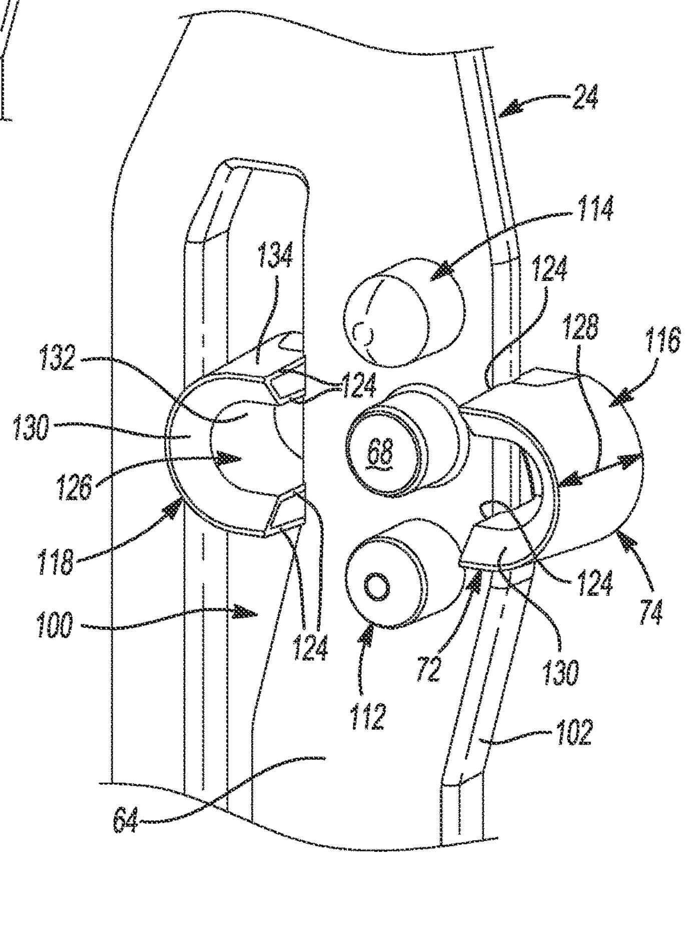
FIG. 6 is an enlarged side perspective view of part of the exemplary water feed tube illustrated in FIG. 5.

With additional reference to FIGS. 4-6, the water feed tube 24 includes a manifold docking retainer 110 that is positioned on the middle segment 44 adjacent to the first outlet 68. The manifold docking retainer 110 is integral with the middle segment 44 of the water feed tube 24, meaning that the structures that make up the manifold docking retainer 110 are formed as one-piece with the water feed tube 24. The manifold docking retainer 110 includes a first knob 112 and a second knob 114 that are positioned to be received in the inlet cavity 86 of the spray arm manifold 36 when the dishwasher 22 rack is slid to the retracted position (as shown in FIG. 1). The manifold docking retainer 110 also includes a first ear 116 and a second ear 118 that are positioned to receive the first and second docking arms 88, 90 of the manifold dock 84 when the dishwasher 22 rack is slid to the retracted position (as shown in FIGS. 1 and 4). Thus, the first and second knobs 112, 114 and the first and second ears 116, 118 of the manifold docking retainer 110 work together to ensure proper mating and alignment between the manifold inlet 78 of the spray arm manifold 36 and the first outlet 80, 68 of the water feed tube 24 when the middle dishwasher rack 32 is slid to the retracted position as shown in FIGS. 1 and 4).

As shown in FIG. 5, the first and second knobs 112, 114 of the manifold docking retainer 110 are positioned above and below the first outlet 68 of the middle segment 44 of the water feed tube 24, respectively. As such, the first and second knobs 112, 114 are aligned with and bisected by a substantially vertical axis 120 that is aligned with and bisects the first outlet 68 of the middle segment 44 of the water feed tube 24. In the illustrated example, the first and second knobs 112, 114 are cylindrical structures that extend forward from the front wall 64 of the middle segment 44 of the water feed tube 24 and terminate at closed ends 72, 74 that are domed. The first and second ears 116, 118 of the manifold docking retainer 110 are positioned to either side of the first outlet 68 of the middle segment 44 of the water feed tube 24, respectively. As such, at least portions of the first and second ears 116, 118 are aligned with a substantially horizontal axis 122 that bisects the first outlet 68 of the middle segment 44 of the water feed tube 24.

As best seen in FIGS. 3-6, each of the first and second ears 116, 118 of the manifold docking retainer 110 has a half-pipe shape with lateral edges 124 that are attached to the first and fourth side walls 102, 108 of the middle segment 44 of the water feed tube 24, respectively, and openings 126 that are sized to receive the first and second docking arms 88, 90 of the manifold dock 84 when the middle dishwasher rack 32 is slid to the retracted position. In addition, each of the first and second ears 116, 118 of the manifold docking retainer 110 has a front end 72 that protrudes forward from the front wall 64 of the middle segment 44 of the water feed tube 24 and a back end 74 that protrudes rearward from the back wall 66 of the middle segment 44 of the water feed tube 24. As such, the first and second ears 116, 118 have a lateral depth 128 that is greater than a depth of the middle segment 44 of the water feed tube 24. A tapered surface 130 is provided at the front end 72 of each of the first and second ears 116, 118, which slopes inwardly towards the openings 126 in the first and second ears 116, 118. Each of the first and second ears 116, 118 further includes an inner arc-shaped wall 132 that defines the openings 126 of the first and second ears 116, 118 and an outer arc-shaped wall 134 that is spaced from the inner arc-shaped wall 132 such that a channel 136 is defined in each of the first and second ears 116, 118. As shown in FIG. 3, the channel 136 is open at the back end 74 of the first and second ears 116, 118.

The design, arrangement, location, and geometry of the first and second knobs 112, 114, the first outlet 68, and the first and second ears 116, 118 allows the manifold docking retainer 110 to be integrally formed with the water feed tube 24 using the same manufacturing process used to create the water feed tube 24. Previously, the docking features associated with the connection interface between the water feed tube 24 and the spray arm manifold 36 were provided on a separate, injection molded part. Unlike previous docking features, the first and second knobs 112, 114, the first outlet 68, and the first and second ears 116, 118 of the manifold docking retainer 110 described herein may be formed using either a blow-molding process or by three-dimensional printing, which may also be used to manufacture the rest of the water feed tube 24. In other words, the first and second knobs 112, 114, the first outlet 68, and the first and second ears 116, 118 of the manifold docking retainer 110 described herein are specially designed to be compatible with blow-molding (i.e., are blow-mold friendly) and/or three-dimensional printing. The design of the integral manifold docking retainer 110 described herein therefore eliminates the cost and the manufacturing and assembly complexities associated with providing docking features on a separate part.

Many modifications and variations of the apparatus and assemblies described in the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A water feed tube assembly for a dishwasher comprising:

a water feed tube including front, back, and side walls;

said water feed tube including at least one inlet and at least one outlet where said outlet is positioned in said front wall of said water feed tube;

said water feed tube including a manifold docking retainer positioned adjacent to said outlet; and said manifold docking retainer is integral with said water feed tube and includes first and second ears that are positioned on and extend integrally from said side walls of said water feed tube, wherein said first and second ears of said manifold docking retainer include openings that are configured to receive said first and second docking arms of a spray arm manifold, wherein each of said first and second ears include an inner-arc shaped wall that defines said openings and an outer arc-shaped wall that is spaced from said inner arc-shaped wall by a channel that is open on a rear side and runs between said inner arc-shaped wall and said outer arc-shaped wall.

2. The water feed tube assembly as set forth in claim 1 wherein said first and second ears are positioned to either side of said outlet of said water feed tube, respectively, such that said first and second ears are aligned with a substantially horizontal axis that bisects said outlet of said water feed tube.

3. The water feed tube assembly as set forth in claim 2 wherein each of said first and second ears has a half-pipe shape with lateral edges that are integrally attached to one of said side walls of said water feed tube.

4. The water feed tube assembly as set forth in claim 3 wherein each of said first and second ears has a front end and a back end where said front end protrudes forward from said front wall of said water feed tube and includes a tapered surface that slopes inwardly towards said opening in each of said first and second ears.

5. The water feed tube assembly as set forth in claim 4 wherein said channel that runs between inner arc shaped wall and said outer arc-shaped wall each of said first and second ears is open at said back end of said first and second ears.

6. The water feed tube assembly as set forth in claim 1 wherein said manifold docking retainer includes first and second knobs that are positioned above and below said outlet of said water feed tube, respectively, to mate with said spray arm manifold where said first and second knobs are aligned with a substantially vertical axis that bisects said outlet of said water feed tube.

7. The water feed tube assembly as set forth in claim 6 wherein said first and second knobs are cylindrical structures that extend forward from said front wall of said water feed tube and terminate at closed ends that are domed and said outlet of said water feed tube is a cylindrical structure that extends forward from said front wall of said water feed tube and terminates at an open end that mates with said spray arm manifold.

8. A water feed tube assembly for a dishwasher comprising:

a water feed tube including front, back, and side walls;

said water feed tube including at least one inlet and at least one outlet where said outlet is positioned in said front wall of said water feed tube;

a spray arm manifold including mounting features that attach to a dishwasher rack that is configured to slide towards and away from said outlet of said water feed tube between an extended position and a retracted position;

said spray arm manifold including a manifold inlet, a manifold dock positioned adjacent to said manifold inlet, a manifold outlet, a manifold passageway extending between said manifold inlet and said manifold outlet, a first spray arm mount adjacent to said manifold outlet;

said manifold dock including a manifold inlet cavity and first and second docking arms that are arranged to each side of said manifold inlet cavity;

said water feed tube including a manifold docking retainer positioned adjacent to said outlet; and said manifold docking retainer is integral with said water feed tube and includes first and second ears that are positioned on and extend integrally from said side walls of said water feed tube, wherein said first and second ears of said manifold docking retainer include openings that are configured to receive said first and second docking arms of said spray arm manifold when said dishwasher rack is slid to said retracted position, wherein each of said first and second ears include an inner-arc shaped wall that defines said openings and an outer arc-shaped wall that is spaced from said inner arc-shaped wall by a channel that is open on a rear side and runs between said inner arc-shaped wall and said outer arc-shaped wall.

9. The water feed tube assembly as set forth in claim 8 wherein said manifold docking retainer includes first and second knobs that are positioned to be received in said inlet cavity of said spray arm manifold when said dishwasher rack is slid to said retracted position.

10. The water feed tube assembly as set forth in claim 9 wherein said first and second knobs are positioned above and below said first outlet of said middle segment of said water feed tube, respectively, such that said first and second knobs are aligned with a substantially vertical axis that bisects said outlet of said water feed tube.

11. The water feed tube assembly as set forth in claim 10 wherein said first and second knobs are cylindrical structures that extend forward from said front wall of said water feed tube and terminate at closed ends that are domed and said outlet of said water feed tube is a cylindrical structure that extends forward from said front wall of said water feed tube and terminates at an open end that is arranged in fluid communication with said manifold inlet when said dishwasher rack is slid to said retracted position.

12. The water feed tube assembly as set forth in claim 8 wherein each of said first and second ears has a half-pipe shape with lateral edges that are integrally attached to one of said side walls of said water feed tube.

13. A water feed tube assembly for a dishwasher comprising:

a water feed tube including a lower segment, an upper segment, and a middle segment extending between said upper and lower segments;

said lower segment of said water feed tube including at least one inlet;

said middle segment of said water feed tube including a front wall, a back wall, at least one outlet on said front wall of said middle segment, and a manifold docking retainer positioned on said middle segment of said water feed tube adjacent to said outlet;

a spray arm manifold including mounting features that attach to a dishwasher rack that is configured to slide towards and away from said middle segment of said water feed tube between an extended position and a retracted position;

said spray arm manifold including a manifold inlet, a manifold dock positioned adjacent to said manifold inlet, a manifold outlet, a manifold passageway extending between said manifold inlet and said manifold outlet, and a first spray arm mount adjacent to said manifold outlet;

said manifold dock including an inlet cavity and first and second docking arms that are arranged to each side of said inlet cavity;

a first spray arm rotatably mounted to said first spray arm mount such that said first spray arm is supported on and rotatable relative to said spray arm manifold; and said manifold docking retainer is integral with said middle segment of said water feed tube and includes first and second ears with openings that are positioned to receive said first and second docking arms of said manifold dock when said dishwasher rack is slid to said retracted position, wherein said water feed tube includes a first conduit, a second conduit, and a third conduit, wherein said first, second, and third conduits are arranged next to one another and are integrally formed as part of said water feed tube and collectively define said front and back walls of said middle segment of said water feed tube, wherein said middle segment of said water feed tube includes a pass-through opening between said second and third conduits and wherein one of said first and second ears is positioned in said pass-through opening in said middle segment.

14. The water feed tube assembly as set forth in claim 13 wherein said at least one inlet includes a first inlet, a second inlet, and a third inlet, wherein said at least one outlet on said front wall of said middle segment includes a first outlet and a second outlet, and wherein said upper segment of said water feed tube includes a third outlet.

15. The water feed tube assembly as set forth in claim 14 wherein said a first conduit is arranged in fluid communication with and extend in between said first inlet in said lower segment of said water feed tube and said first outlet in said middle segment of said water feed tube, said second conduit arranged in fluid communication with and extends between said second inlet in said lower segment of said water feed tube and said second outlet in said middle segment of said water feed tube, and said third conduit is arranged in fluid communication with and extends between said third inlet in said lower segment of said water feed tube and said third outlet in said upper segment of said water feed tube.

16. The water feed tube assembly as set forth in claim 15 wherein said third conduit in said water feed tube is arranged between said first and second conduits and wherein said first and third conduits are positioned to one side of said pass-through opening in said middle segment of said window feed tube and said second conduit is positioned to an opposite side of said pass-through opening in said middle segment of said water feed tube.

17. The water feed tube assembly as set forth in claim 16 wherein said first conduit defines a first side wall of said middle segment of said water feed tube, said second conduit defines a second side wall of said middle segment of said water feed tube and a third side wall where said second conduit borders said pass-through opening in said middle segment, and said third conduit defines a fourth side wall of said middle segment of said water feed tube where said third conduit borders said pass-through opening in said middle segment.

18. The water feed tube assembly as set forth in claim 17 wherein said first ear of said manifold docking retainer is positioned on and extends integrally from said first side wall of said middle segment of said water feed tube and said second ear of said manifold docking retainer is positioned on and extends integrally from said fourth side wall of said middle segment of said water feed tube such that said second ear is positioned in said pass-through opening between said second and third conduits.

19. The water feed tube assembly as set forth in claim 13 wherein said upper and lower segments of said water feed tube extend in substantially horizontal directions and said middle segment of said water feed tube extends in a substantially vertical direction.

20. The water feed tube assembly as set forth in claim 13 wherein said upper segment of said water feed tube includes another outlet and a second spray arm mount adjacent thereto and wherein a second spray arm is rotatably mounted to said second spray arm mount such that said second spray arm is supported on and rotatable relative to said upper segment of said water feed tube.

* * * * *